(12) United States Patent
Yan et al.

(10) Patent No.: US 8,060,148 B2
(45) Date of Patent: Nov. 15, 2011

(54) METHOD AND APPRATUS FOR WIRELESSLY TRANSMITTING DISPLAY SIGNALS, AND DISPLAY DEVICE

(75) Inventors: Xiaoping Yan, Beijing (CN); Zihua Guo, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 833 days.

(21) Appl. No.: 11/992,264

(22) PCT Filed: Mar. 22, 2006

(86) PCT No.: PCT/CN2006/000465
§ 371 (c)(1),
(2), (4) Date: Mar. 19, 2008

(87) PCT Pub. No.: WO2007/036090
PCT Pub. Date: Apr. 5, 2007

(65) Prior Publication Data
US 2009/0267952 A1    Oct. 29, 2009

(30) Foreign Application Priority Data

Sep. 27, 2005  (CN) .......................... 2005 1 0105749

(51) Int. Cl.
*H04B 1/38* (2006.01)
(52) U.S. Cl. ..... 455/566; 455/145; 455/557; 455/556.1; 455/344
(58) Field of Classification Search .................. 455/566, 455/145, 146, 151.2, 154.2, 158.4, 158.5, 455/575.1, 550.1, 557, 186.1, 422.1, 556.1, 455/344; 345/156; 709/222; 379/16, 17, 379/102.02, 100.02, 100.12
See application file for complete search history.

(56) References Cited

U.S. PATENT DOCUMENTS

| | | | | |
|---|---|---|---|---|
| 6,392,692 | B1 * | 5/2002 | Monroe | 348/143 |
| 7,782,363 | B2 * | 8/2010 | Ortiz | 348/211.8 |
| 2002/0109733 | A1 * | 8/2002 | Watanabe et al. | 345/838 |
| 2003/0017846 | A1 | 1/2003 | Estevez et al. | |
| 2003/0202006 | A1 * | 10/2003 | Callway | 345/719 |
| 2004/0109015 | A1 * | 6/2004 | Peng | 345/716 |
| 2005/0094591 | A1 * | 5/2005 | Kwon | 370/321 |
| 2005/0289631 | A1 * | 12/2005 | Shoemake | 725/118 |

FOREIGN PATENT DOCUMENTS

| | | |
|---|---|---|
| CN | 1334664 A | 2/2002 |
| CN | 1387133 A | 12/2002 |
| CN | 1445964 A | 10/2003 |
| JP | 2000305542 A | 11/2000 |
| JP | 2003153137 A | 5/2003 |
| JP | 2004054783 A | 2/2004 |
| KR | 20030003919 A | 1/2003 |

(Continued)

*Primary Examiner* — Dominic E Rego
(74) *Attorney, Agent, or Firm* — Kinney & Lange, P.A.

(57) ABSTRACT

The present invention discloses an apparatus for wirelessly transmitting display signals between a plurality of external host device and a display device. The apparatus comprises a wireless signal transceiver unit for establishing a network-transmission-protocol-based high-frequency signal channel for respective external host devices; a main controller, connected to the wireless signal transceiver unit, for analyzing signals from the wireless signal transceiver unit to extract information of the plurality of external host devices, configuration information and/or the display data, performing configurations and display mode selection based on the configuration information, and outputting the active display data; an image data process control unit, connected to the main controller and the display device, for storing the display data from the main controller, controlling the output of the display data, and performing timing control to interface signals of the display device.

12 Claims, 3 Drawing Sheets

| | FOREIGN PATENT DOCUMENTS | | | WO | 03009601 A1 | 1/2003 |
|---|---|---|---|---|---|---|
| KR | 2003014039 A | 2/2003 | | WO | 2005002218 A1 | 1/2005 |
| KR | 20040103608 A | 12/2004 | | * cited by examiner | | |

METHOD AND APPRATUS FOR WIRELESSLY TRANSMITTING DISPLAY SIGNALS, AND DISPLAY DEVICE

BACKGROUND OF THE INVENTION

1. Field of the Invention

The present invention relates to data wireless transmission and data process techniques, more particularly, to a method and an apparatus for wirelessly transmitting display signals, and a display device thereof.

2. Description of the Related Art

Nowadays, communication is increasing in frequency and information amount. With the development of the electronic technology and material industry, various electronic data processing systems are used, and thus various display equipments and devices are widely and frequently used inevitably.

Recently, display devices have become a key part of usual life. The display devices are basically classified into: Cathode Ray Tube (CRT) displays, which are the main display sections of desktop computers; flat panel displays including Liquid Crystal Displays (LCDs) and plasma displays, which are displays widely applied in various fields, such as computers and home appliances; large screen display devices including Digital Lighting Processor (DLP) large projectors and television walls, which are preferably used in public.

As the display devices, they have a common characteristic that the input display data is of large amount and requires large bandwidth, which is also the key reason why most recently used display devices transmit their signals with cables.

However, there are disadvantages to connect the display devices by cable. For example, a desktop computer has to connect to the CRT display via a cable, and thus the distance is limited by the cable. Therefore, the mobility of the computer is also limited. Further, the display device is a specific device in a one-to-one correspondence. If some host devices share one flat panel display, plugging and drawing connections are frequently performed. More importantly, these host devices can not simultaneously display their respective contents on one display device having a large screen. Presently, the size of the display screen is increasing, and there is a demand and intend to use one display device by a plurality of host users, which is also a key technical problem.

For this reason, it is desired to wirelessly transmit signals to the display devices so as to overcome the limitations of the cables. In prior art, there is a method for wirelessly transmitting display signals, which comprises the step of: performing a deep compression (loss compression) on images by a host device to obtain compressed displaying signals; transmitting the compressed displaying signals to the display device by using IEEE 802.11a/b wireless transmission techniques; after receiving the compressed displaying signals wirelessly, the performing decompression to the compressed displaying signals by the display device to restore array image; and outputting and displaying the restored array image according to the requirements of the interface signal of the display device. However, the conventional method has following drawbacks. Since the wireless transmission techniques (IEEE 802.11a/b) can not solve the problem of data stream with high data rate for the display device well, the deep and loss compression is employed, which makes the displayed image not as good as the original image and can not be synchronized. In addition, since only the design manner of compression and decompression can be used, the cost can not be readily controlled, and it is also difficult to make a design in which a plurality of host devices simultaneously display their respective contents on one display device.

In view of above described problems, there is a need for providing a novel display signal transmitting mechanism to solve these problems.

SUMMARY OF THE INVENTION

For the drawbacks in prior art, an object of the present invention is to provide a method and an apparatus for wireless transmitting display signals, which can achieve the wireless transmission of the display signals without deep and loss compression, so as to improve the display quality, and a display device using the same.

Another object of the present invention is to achieve the multi-user usage of a display device in which the display device can be freely switched and shared.

According to one aspect of the present invention, there is provided an apparatus for wirelessly transmitting display signals between a plurality of external host devices and a display device, the apparatus comprising:

a wireless signal transceiver unit for establishing a network-transmission-protocol-based high-frequency signal channel for respective external host devices;

a main controller, connected to the wireless signal transceiver unit, for analyzing signals from the wireless signal transceiver unit to extract information of the plurality of external host devices, configuration information and/or the display data, performing configurations and display mode selection based on the configuration information, and outputting the active display data;

an image data process control unit, connected to the main controller and the display device, for storing the display data from the main controller, controlling the output of the display data, and performing timing control to interface signals of the display device.

Preferably, the wireless signal transceiver unit comprises: an antenna for transmitting and receiving high-frequency analog signals; and a wireless transmitting unit for performing analog-to-digital/digital-to-analog conversion, encoding/decoding, modulation/demodulation to the high-frequency signals.

Preferably, the wireless transmitting unit is an ultra-wide-band wireless unit or a high bandwidth wireless network card, and comprises a radio-frequency transmission section, and a base band and media access control section.

Preferably, the image data process control unit includes:

a screen-division controller for combining the display data from different host devices into the complete display data when external host devices which simultaneously use the display device simultaneously use the display device and a screen-division display is required;

an image storage controller for performing access control of the images;

an image output controller for generating different output timing signals and synchronization signals based on different display modes and refresh frequency.

Preferably, the main controller is further used for, based on the information of the plurality of external host devices, determining whether the host devices are allowed to share the display device, maintaining a list of host devices and providing parameters for screen-division control, and controlling the requirements for output formats and data corresponding to the respective external host devices.

Preferably, the apparatus may further comprise a digital-to-analog conversion unit, located on the image data process control unit and the display device, for converting the display data from the image data process control unit into analog signals, and then outputting them to the display device.

Preferably, the apparatus may also decompress the lossless compressed display data transmitted from the plurality of external host devices.

The present invention also provides a display device comprising a display apparatus and the aforementioned apparatus for wirelessly transmitting display signals, wherein the apparatus for wireless transmitting display signals is provided in the display device, receives the display signals from the plurality of external host devices, and transmits these signals to the display apparatus.

The present invention further provides a method for wirelessly transmitting display signals between a plurality of external host device and a display device, the method comprising the steps of:

a) wirelessly receiving high-frequency signals from the plurality of external host devices based on a network transmission protocol;

b) analyzing the received signals to extract information of the plurality of external devices, configuration information and/or the display data, performing configurations and display mode selection based on the configuration information, and outputting the active display data;

c) processing the active display data, controlling timing of interface signals of the display device, and outputting the display data to the display device.

Preferably, in the step c), the processing comprises the steps of: combining the display data from respective external host devices into the complete display data when the plurality of external host devices simultaneously use the display device and a screen-division display is required; performing access control of the images; and generating different output timing signals and synchronization signals based on different display modes and refresh frequencies.

Preferably, the method further comprises the steps of determining, before the step b), whether the host devices which simultaneously use the display device are allowed to share the display device based on the information of the external device; maintaining a list of the external host devices and providing parameters for screen-division control; and controlling requirements for output formats and data corresponding to the respective external host devices.

Preferably, before the step a), it further comprises the step of controlling, by a certain external host device, the requirements for output formats and data corresponding to the respective external host devices other than the certain external host device.

Preferably, the step c) further comprises a step of converting the display data into analog signals before outputting them to the display device.

Preferably, it further comprises the step of decompressing the lossless compressed display data transmitted from the plurality of external host devices.

As compared with the prior arts, the present invention has the following advantages. Since the present invention employs the high-frequency signals to wirelessly transmitting the display data, the general-used display devices can get rid of the limitation of the cable connected to the host devices, and thus facilitate for the usage of mobile devices.

Further, since the ultra-wideband wireless transmitting unit is used, the original array image data can be directly transmitted and received, such that the display device can synchronously display the image in the quality as good as the original image.

Moreover, the present invention employs the network transmission protocol and the screen-division control, such that the plurality of host devices may transmit the data to be displayed to one and the same display device for the screen-division processes. Therefore, the display device may perform the multi-host screen-division display.

DETAILED DESCRIPTION OF THE PRESENTLY PREFERRED EMBODIMENTS

Figure 1:
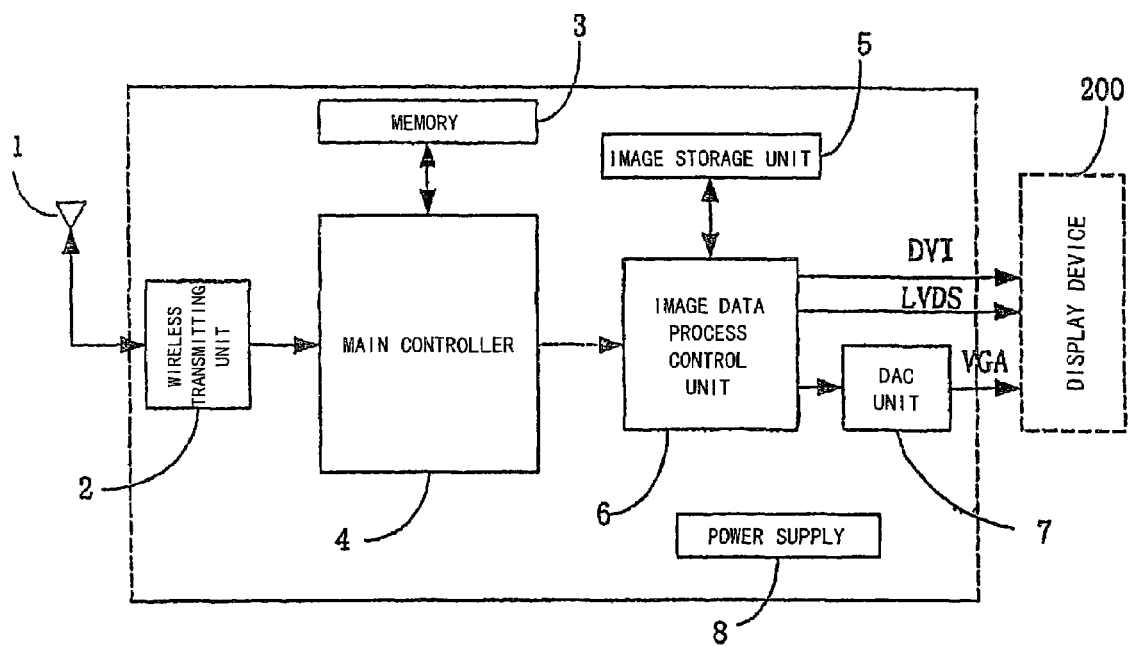
FIG. 1 is a block diagram showing the apparatus for wirelessly transmitting display signals according to an embodiment of the present invention.

FIG. 1 is a block diagram showing the apparatus for wirelessly transmitting display signals according to an embodiment of the present invention.

As shown in FIG. 1, the wireless transmitting apparatus comprises an antenna 1, a wireless transmitting unit 2, a memory 3, a main controller 4, an image storage unit 5, an image data process control unit 6, a Digital-to-Analog Conversion (DAC) unit 7 and a power supply 8.

The antenna 1 is used to transmit and receive Radio-Frequency (RF) analog signals in high frequency band, and is connected to the wireless transmitting unit 2.

The wireless transmitting unit 2 may be a Ultra-WideBand (UWB) wireless unit, or may be an IEEE 802.11x high bandwidth wireless network card having a satisfactory bandwidth. The wireless transmitting unit 2 generally includes an RF section, a base band and media access control section (not shown). The RF section transmits and receives the high-frequency analog signals, filters the received signals, and may controls the input/output rates of the data signals. The base band and media access control section performs the analog-to-digital/digital-to-analog conversion, encoding/decoding, modulation/demodulation of the RF signals, complies with the standard of the media access control protocol, and provides an interface to the main controller 4.

The memory 3 includes a non-volatile memory block and a volatile memory unit (not shown), and is connected to the main controller 4 to provide a run environment for the main controller 4. The non-volatile memory block stores the program codes executed by the main controller 4. The program codes will not be lost if the power is off. The volatile memory unit runs after it is powered on, and may store the program codes and may also buffer the data.

The main controller 4 analyzes the data received by the wireless transmitting unit 2 to extract address information and corresponding data, configuration information and image array data contained in the data received from different host devices, performs configurations and mode selections based on the configuration information, and transmits the active image array data to the image data process control unit 6 for further processing.

The image data process control unit 6 performs the framing storage of the array images, screen-division image framing control, timing control for the interface signals of the display device and refreshing control for the array image, and outputs digital signals such as DVI, LVDS (Digital Video Interface, Low Voltage Differential Signaling) and the like. The image data process control unit 6 may be connected to an external display devices having a digital interface, and may also be connected to the DAC unit 7 which executes digital-to-analog conversion, and then the converted data is transmitted to the display device 200.

The image storage unit 5 connects to the image data process control unit 6. The image storage unit 5 stores the array image data processed by the image data process control unit 6 in image frames.

The DAC unit 7 connects to the image data process control unit 6. The DAC unit 7 converts digital display output signals to analog signals, and then converts them into VGA signals. The DAC unit 7 may connect to a display device supporting VGA signals.

The power supply 8 supplies power to the apparatus for wirelessly transmitting display signals according to the present invention for its operation.

It should be noted that the apparatus for wirelessly transmitting display signals according to the present invention could be also provided in the display device. In that case, the apparatus of the present invention does not require a separate power supply 8 and can be powered by the power supply of the display device.

Further, in the apparatus for wirelessly transmitting display signals, the number of the wireless transmitting units 2 may be one or more than one, and the main controller 4 provides more interfaces to connect the corresponding wireless transmitting units 2.

Figure 2:
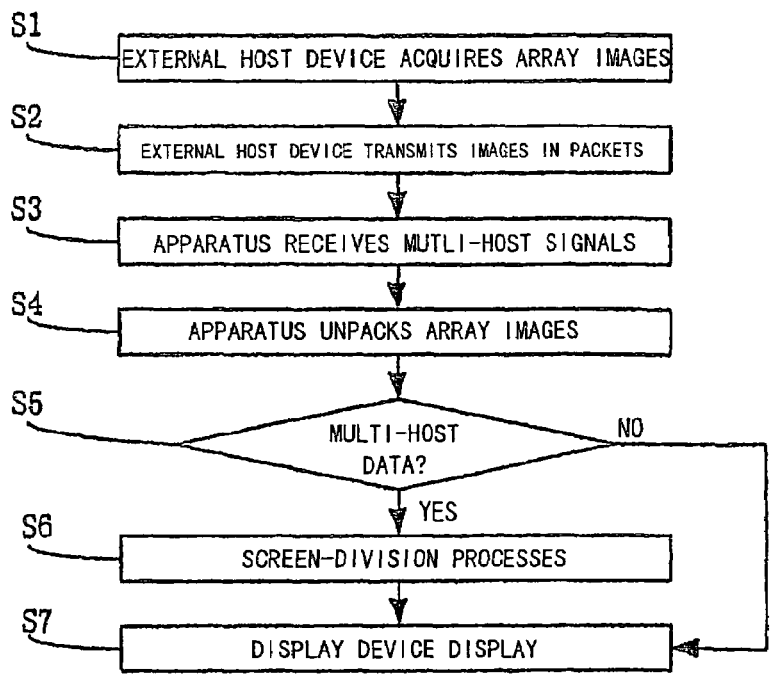
FIG. 2 is a flowchart showing the method for wirelessly transmitting display signals according to an embodiment of the present invention.

FIG. 2 is a flowchart showing the method for wirelessly transmitting display signals according to an embodiment of the present invention.

The method for wirelessly transmitting display signals according to the present invention comprises the following steps.

Step S1: each of the external host devices directly acquires the image array data to be output, and may perform the format conversion to the image array data. It should be noted that the external host devices may not perform the format conversion.

Step S2: the external host devices splits the array images, and encapsulates them into a plurality of packets together with packet information such as address and state complying with the wireless transmission standard. Then, the encapsulated packets are transmitted from the wireless transmitting units of respective host devices. This wireless transmitting unit is similar or compatible with the wireless unit in the apparatus of the present invention.

Step S3: the apparatus of the present invention receives the data from respective host devices having different addresses, and extracts data packets having the array images.

Step S4: the apparatus of the present invention unpacks the array image data, and removes the information such as headers.

Step S5: the apparatus of the present invention makes judgment on the array image data to determine whether the array image data is a single host array image data or multi-host array image data. If it is a single array image host data, the flow advances to step S7. Otherwise, if it is multi-host array image data, the flow advances step S6 to process the multi-host array image data.

Step S6: the apparatus of the present invention performs screen-division process on the multi-host array image data, and then combines the multi-host array image data into one complete image frame.

Step S7: the apparatus of the present invention outputs the complete image frame to the display device for displaying, and refreshes the display device with the required frequency.

Figure 3:
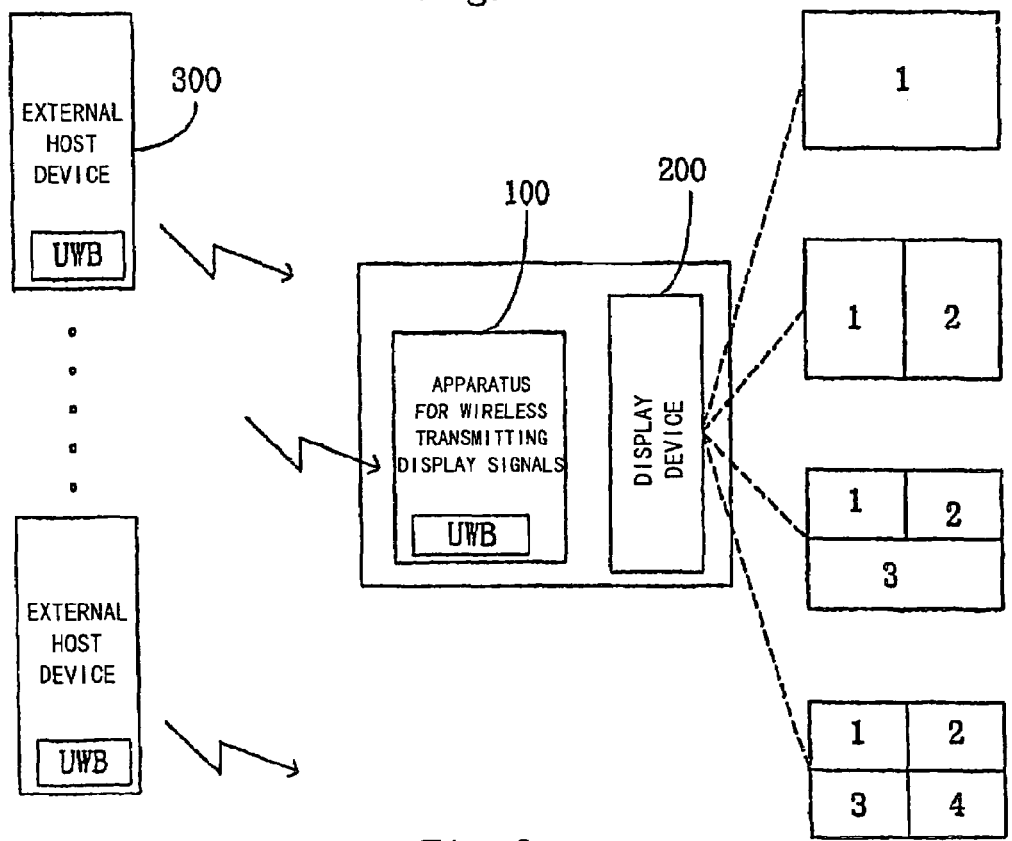
FIG. 3 is a schematic diagram illustrating the multi-user usage performed by the apparatus for wirelessly transmitting display signals according to the embodiment of the present invention.

FIG. 3 is a schematic diagram illustrating the multi-user usage performed by the apparatus for wirelessly transmitting display signals according to the present invention.

The apparatus 100 for wirelessly transmitting display signals is connected to the display device 200, and may receive the display contents from a plurality of external host devices 300.

The host devices 300 may be personal computers (PCs), laptop computers, handheld devices (such as smart mobile phones, handheld players and the like). The display device 200 may be a projector, a display, a television and so on.

The display device 200 may display in different modes. For example, in a case where there is only one host device 300, the display device 200 may perform a full-screen display. In a case where there are more then one host devices 300, the display device 200 may perform a screen-division display.

In screen-division display mode, the apparatus 100 sends different output format requirements to respective host devices 300 according to the sizes of the respective user screen-divisions, such that different host devices 300 transmit different amounts of display signals. On one hand, the data amounts transmitted from the host devices 300 can be reduced; on the other hand, it may ensure that the apparatus 100 processes the same amount of data in the case of one user as that of several users.

In the screen-division display mode, it is also possible that a certain host device 300 initiates the control to notify other host devices 300 of corresponding output format requirements.

Figure 4:
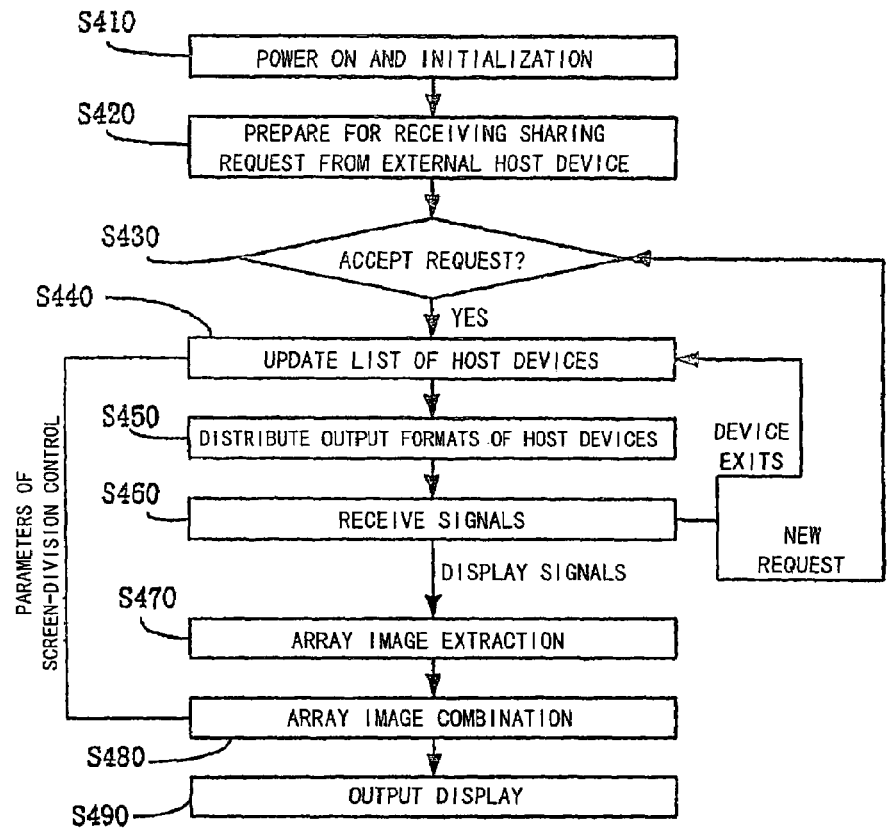
FIG. 4 is a flowchart showing an example in which the apparatus for wirelessly transmitting display signals according to the present invention performs the multi-user screen-division display.

FIG. 4 is a flowchart showing an example in which the apparatus for wirelessly transmitting display signals according to the present invention performs the multi-user screen-division display.

Step S410: the apparatus for wirelessly transmitting display signals is powered on and initialized.

Step S420: the apparatus enters into a default display mode and prepares to receive a sharing request from one or more external host devices.

Step S430: according to the priority of the user and the user authentication, it is determined whether the request is accepted or not. For an authorized user, the flow advances to step S440; otherwise, for an unauthorized user, the flow does not respond to the request.

Step S440: the request is accepted and the list of host devices and user information are updated.

Step S450: the parameters for screen-division control are provided, a new display mode is determined, and the requirements for the output formats and data of respective external host devices are distributed again.

Step S460: the display signals and state information are received from the respective host devices, and are then processed respectively. The state information indicates whether or not a certain external host device exits the screen-division display and whether or not a new external host device joins the screen-division display.

If a new external host device requests to join the screen-division display, it directly returns to step S430 to make a judgment on the request. If a certain host device exits or fails, it directly returns to step S440 to update the list of host devices.

For the display signals, the following processes are performed.

Step S470: the data packets transmitted from respective host devices are unpacked to extract the array image data.

Step S480: the array images are combined according to the parameters of screen-division control such that the display contents of multiple users are combined into one complete image frame.

Step S490: the image frame is outputted and refreshed in the determined mode and frequency.

Thus, the function which the host devices of multiple users may dynamically join into the screen-division display with the one display device can be achieved.

It can be understood by those skilled in the art that the states of the host devices and the parameters of screen-division control can be adjusted and managed by a certain host device which thus may cooperate with the apparatus for wirelessly transmitting display signals of the present invention to perform the screen-division display for users more than one.

Figure 5:
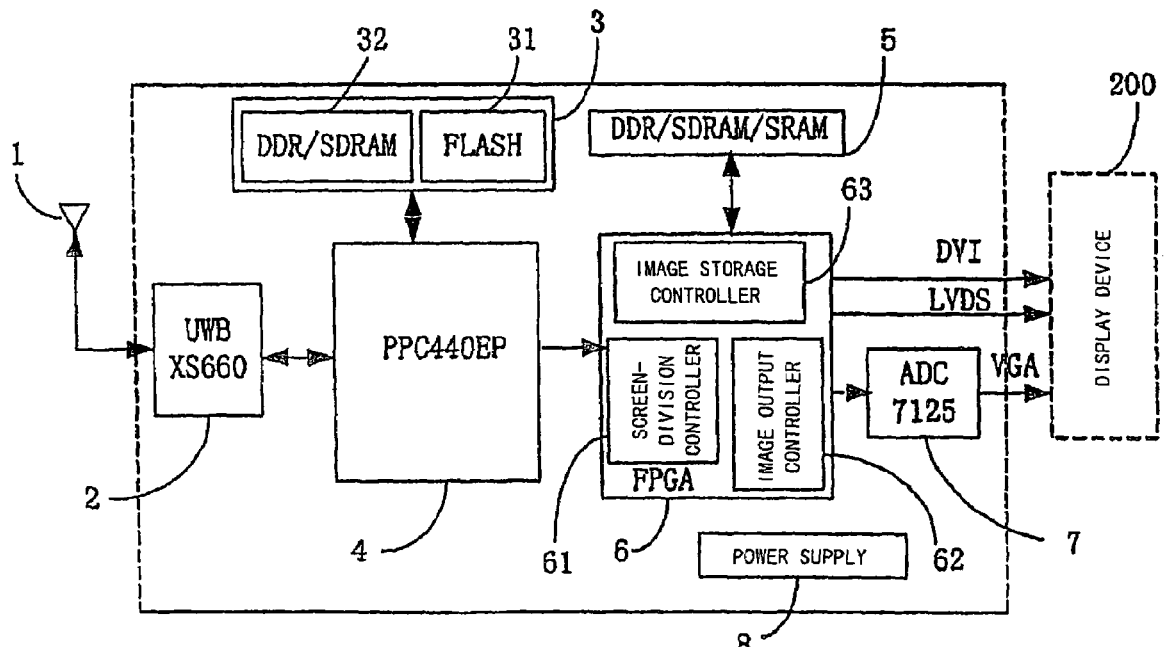
FIG. 5 is a block diagram showing an example of the apparatus for wirelessly transmitting display signals according to the present invention.

FIG. 5 is a block diagram showing an example of the apparatus for wirelessly transmitting display signals according to the present invention.

In this example, the antenna 1 and the wireless transmitting unit 2 may be a specific antenna and a newest UWB XS660 wireless transmitting unit, both come from the Freescale Company.

The memory 3 includes a DDR/SDRAM volatile memory 32 and a FLASH non-volatile memory 31 for storing the data and the program code data, respectively.

The main controller 4 may be a PPC440EP processor based on the POWER PC architecture from the AMCC Company. The main controller 4 performs the protocol parsing, the network control, the extraction and output of the array image data in this example, which is the control kernel of the inventive apparatus.

The image storage unit 5 includes a memory of DDR/SDRAM/SRAM type, and stores the array image data in frames.

The image data process control unit 6 can be implemented with a Field Programmable Gate Array (FPGA) from the Xilinx Company. The image data process control unit 6 comprises a screen-division controller 61, an image output controller 62 and an image storage controller 63. The screen-division controller 61 processes data from different users, and combines the image data from different users according to the address space into one complete image when a plurality of users simultaneously use the display device and the screen-division display is required. The image storage controller 63 stores the data into the image storage unit 5. Further, the image storage controller 63 cooperates with the image output controller 62 to output the array image frame by frame. The image output controller 62 generates different output timing signals and, line and field synchronization signals according to different display modes and refresh frequencies.

The DAC unit 7 may be an ADV 7125 from the ADI Company. The DAC unit 7 performs the digital-to-analog conversion on the array image frame signals so as to meet the output requirements for the display devices supporting VGA.

The power supply 8 receives an input voltage of 5V and provides voltage outputs of 3.3V and 2.5V to the inventive apparatus. The power supply 8 may be two TPS54310s to provide voltage outputs of 3.3V and 2.5V, respectively.

In summary, the apparatus for wirelessly transmitting display signals according to the present invention comprises the wireless wideband access unit which can be input data stream having high data rate, and may connect to the standard display devices through various display output interfaces such as DVI, LVDS, and VGA. The apparatus for wirelessly transmitting display signals may be provided in the display devices to form the wideband wireless display devices. The present invention may perform the wireless receiving and controlling on image data, and display images on the display devices without perform loss compression on the data.

In an example of the present invention, the apparatus of the present invention employs the UWB technique with a maximum transmission rate up to Gbps. As compared with this, the array data satisfying the SVGA output only requires several hundred Mbps. Therefore, the apparatus of the present invention may directly transmit and receive the original array image data such that the image is equivalent to the original image. It should be noted that the present invention is not limited thereto, the image may be also simply compressed.

In addition, the apparatus of the present invention uses the network protocol to perform the wideband wireless communication transmission for display data, has the ability of accessing and communicating with a plurality of host devices. Thus, multi-host screen-division display can be easily achieved by screen-division control. The apparatus of the present invention has the screen-division mechanism and can simultaneously support more than one host devices so as to perform the multi-user screen-division display process and display output.

Although illustrative embodiments of the present invention have been described herein in detail, those skilled in the art will appreciate that variations and modifications may be made without departing from the principles of this invention, which shall be considered as to be encompassed in the protection scope thereof.

What is claimed is:

1. An apparatus for wirelessly transmitting display signals between a plurality of external host devices and a display device, the apparatus comprising:

a wireless signal transceiver unit for establishing a network-transmission-protocol-based high-frequency signal channel for respective external host devices;

a main controller, connected to the wireless signal transceiver unit, for analyzing signals from the wireless signal transceiver unit to extract information of the plurality of external host devices, configuration information and/or display data, performing configurations and display mode selection based on the configuration information, and outputting the display data; and an image data process control unit, connected to the main controller and the display device, for storing the display data from the main controller, controlling output of the display data, and performing timing control to interface signals of the display device;

wherein the main controller is operable to, based on the information of the plurality of external host devices, determine whether the host devices are allowed to share the display device, maintain a list of host devices and provide parameters for screen-division control, and control the requirements for output formats and data corresponding to the respective external host devices.

2. The apparatus for wirelessly transmitting display signals according to claim 1, wherein the wireless signal transceiver unit comprises an antenna for transmitting and receiving high-frequency analog signals; and a wireless transmitting unit for performing analog-to-digital/digital-to-analog conversion, encoding/decoding, modulation/demodulation to the high-frequency signals.

3. The apparatus for wirelessly transmitting display signals according to claim 2, wherein the wireless transmitting unit is an ultra-wideband wireless unit or a high bandwidth wireless network card, and comprises a radio-frequency transmission section, and a base band and media access control section.

4. The apparatus for wirelessly transmitting display signals according to claim 1, wherein the image data process control unit comprises:
   a screen-division controller for combining the display data from different host devices into complete display data when the external host devices simultaneously use the display device and a screen-division display is required;
   an image storage controller for performing access control of images; and
   an image output controller for generating different output timing signals and synchronization signals based on different display modes and refresh frequency.

5. The apparatus for wirelessly transmitting display signals according to claim 1, further comprising a digital-to-analog conversion unit, located between the image data process control unit and the display device, for converting the display data from the image data process control unit into analog signals, and then outputting them to the display device.

6. The apparatus for wirelessly transmitting display signals according to claim 1, wherein the apparatus decompresses lossless compressed display data transmitted from the plurality of external host devices.

7. A display device comprising a display apparatus and the apparatus for wirelessly transmitting display signals according to claim 1, wherein the apparatus for wireless transmitting display signals is provided in the display device, receives the display signals from the plurality of external host devices, and transmits these signals to the display apparatus.

8. A method for wirelessly transmitting display signals between a plurality of external host devices and a display device, the method comprising the steps of:
   a) wirelessly receiving high-frequency signals from the plurality of external host devices based on a network transmission protocol;
   b) analyzing the received signals to extract information of the plurality of external devices, configuration information and/or display data, performing configurations and display mode selection based on the configuration information, and outputting the display data; and
   c) processing the display data, controlling timing of interface signals of the display device, and outputting the display data to the display device;
   wherein the method further comprises the steps of:
   determining, before the step b), whether the external host devices which simultaneously use the display device are allowed to share the display device based on the information of the external host devices;
   maintaining a list of the external host devices and providing parameters for screen-division control; and
   controlling requirements for output formats and data corresponding to the respective external host devices.

9. The method for wirelessly transmitting display signals according to claim 8, wherein in the step c), the processing comprises the steps of:
   combining the display data from respective external host devices into complete display data when the plurality of external host devices simultaneously use the display device and a screen-division display is required;
   performing access control of images; and
   generating different output timing signals and synchronization signals based on different display modes and refresh frequencies.

10. The method for wirelessly transmitting display signals according to claim 8, further comprising a step of controlling, before the step a), by a certain external host device, the requirements for output formats and data corresponding to the respective external host devices other than the certain external host device.

11. The method for wirelessly transmitting display signals according to claim 8, wherein the step c) further comprises a step of converting the display data into analog signals before outputting them to the display device.

12. The method for wirelessly transmitting display signals according to claim 8, further comprising a step of decompressing lossless compressed display data transmitted from the plurality of external host devices.

* * * * *

UNITED STATES PATENT AND TRADEMARK OFFICE
CERTIFICATE OF CORRECTION

PATENT NO. : 8,060,148 B2  
APPLICATION NO. : 11/992264  
DATED : November 15, 2011  
INVENTOR(S) : Xiaoping Yan and Zihua Guo It is certified that error appears in the above-identified patent and that said Letters Patent is hereby corrected as shown below:

Title Page, item (54) and Column 1, line 1;
Title:
  Delete "APPRATUS"
  Insert --APPARATUS--

Signed and Sealed this
Nineteenth Day of March, 2013

Teresa Stanek Rea
*Acting Director of the United States Patent and Trademark Office*